US010136447B2

(12) United States Patent
Chatterjee et al.

(10) Patent No.: US 10,136,447 B2
(45) Date of Patent: *Nov. 20, 2018

(54) SIGNALING FOR INTER-CELL D2D DISCOVERY IN AN LTE NETWORK

(71) Applicant: Intel IP Corporation, Santa Clara, CA (US)

(72) Inventors: Debdeep Chatterjee, Mountain View, CA (US); Alexey Vladimirovich Khoryaev, Nizhny Novgorod (RU); Sergey Panteleev, Nizhny Novgorod (RU); Mikhail Shilov, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,540

(22) Filed: Sep. 27, 2017

(65) Prior Publication Data

US 2018/0020459 A1 Jan. 18, 2018

Related U.S. Application Data

(63) Continuation of application No. 15/026,174, filed as application No. PCT/US2014/061569 on Oct. 21, 2014.

(Continued)

(51) Int. Cl.
*H04B 7/00* (2006.01)
*H04W 36/00* (2009.01)
(Continued)

(52) U.S. Cl.
CPC .......... *H04W 72/10* (2013.01); *H04B 17/318* (2015.01); *H04J 3/1694* (2013.01);
(Continued)

(58) Field of Classification Search
CPC ..... H04W 76/18; H04W 76/15; H04W 28/08; H04W 74/0833; H04W 56/001;
(Continued)

(56) References Cited

U.S. PATENT DOCUMENTS 8,892,103 B2 11/2014 Axmon et al.
9,118,452 B2 8/2015 Park et al.
(Continued)

FOREIGN PATENT DOCUMENTS

CN 100411470 C 8/2008
CN 102883451 A 1/2013
(Continued)

OTHER PUBLICATIONS

US 9,967,894, 05/2018, Chatterjee et al. (withdrawn)
(Continued)

*Primary Examiner* — Huy C Ho
(74) *Attorney, Agent, or Firm* — Schwegman Lundberg & Woessner, P.A.

(57) ABSTRACT

Embodiments of an enhanced node B (eNB), user equipment (UE) and methods of signaling for proximity services and device-to-device (D2D) discovery in an LTE network are generally described herein. In some embodiments, the eNB may support inter-cell device-to-device (D2D) discovery by transmitting signaling, to a first user equipment (UE), to indicate configuration information for a D2D discovery resource pool including D2D resources configured by one or more neighboring cells. The configuration information includes timing offsets between a serving cell of the first UE and the one or more neighboring cells. Other apparatuses and methods are also described.

25 Claims, 4 Drawing Sheets

Related U.S. Application Data

(60) Provisional application No. 61/898,425, filed on Oct. 31, 2013.

(51) Int. Cl.

| | | |
|---|---|---|
| H04W 72/10 | (2009.01) | |
| H04W 28/08 | (2009.01) | |
| H04W 74/08 | (2009.01) | |
| H04B 17/318 | (2015.01) | |
| H04W 56/00 | (2009.01) | |
| H04L 5/00 | (2006.01) | |
| H04J 3/16 | (2006.01) | |
| H04W 76/02 | (2009.01) | |
| H04W 8/06 | (2009.01) | |
| H04W 8/18 | (2009.01) | |
| H04W 60/00 | (2009.01) | |
| H04W 60/02 | (2009.01) | |
| H04W 72/08 | (2009.01) | |
| H04W 72/04 | (2009.01) | |
| H04W 52/34 | (2009.01) | |
| H04W 8/00 | (2009.01) | |
| H04W 4/02 | (2018.01) | |
| H04W 4/00 | (2018.01) | |
| H04W 48/12 | (2009.01) | |
| H04W 28/02 | (2009.01) | |
| H04W 48/18 | (2009.01) | |
| H04W 48/08 | (2009.01) | |
| H04W 74/00 | (2009.01) | |
| H04W 48/06 | (2009.01) | |
| H04W 24/10 | (2009.01) | |
| H04W 76/14 | (2018.01) | |
| H04W 76/18 | (2018.01) | |
| H04W 76/10 | (2018.01) | |
| H04W 76/19 | (2018.01) | |
| H04W 4/60 | (2018.01) | |
| H04W 76/15 | (2018.01) | |
| H04W 4/80 | (2018.01) | |
| H04W 40/00 | (2009.01) | |
| H04W 72/00 | (2009.01) | |
| H04W 88/16 | (2009.01) | |
| H04W 88/02 | (2009.01) | |
| H04B 7/0413 | (2017.01) | |
| H04W 8/04 | (2009.01) | |
| H04W 88/08 | (2009.01) | |
| H04W 84/12 | (2009.01) | |
| H04W 92/20 | (2009.01) | |

(52) U.S. Cl.
CPC ........... *H04L 5/0007* (2013.01); *H04W 4/003* (2013.01); *H04W 4/008* (2013.01); *H04W 4/02* (2013.01); *H04W 4/023* (2013.01); *H04W 4/60* (2018.02); *H04W 4/80* (2018.02); *H04W 8/005* (2013.01); *H04W 8/06* (2013.01); *H04W 8/183* (2013.01); *H04W 24/10* (2013.01); *H04W 28/0215* (2013.01); *H04W 28/08* (2013.01); *H04W 36/0055* (2013.01); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/02* (2013.01); *H04W 76/023* (2013.01); *H04W 76/025* (2013.01); *H04W 76/027* (2013.01); *H04W 76/028* (2013.01); *H04W 76/10* (2018.02); *H04W 76/14* (2018.02); *H04W 76/15* (2018.02); *H04W 76/18* (2018.02); *H04W 76/19* (2018.02); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 92/20* (2013.01)

(58) Field of Classification Search
CPC ..... H04W 76/028; H04W 76/02; H04W 8/06; H04W 8/183; H04W 60/00; H04W 60/02; H04W 72/10; H04W 72/085; H04W 72/0453; H04W 56/002; H04W 52/346; H04B 17/318; H04L 5/0007; H04J 3/1694
USPC ...................................................... 455/518
See application file for complete search history.

(56) References Cited

U.S. PATENT DOCUMENTS

| | | |
|---|---|---|
| 9,144,091 B2 | 9/2015 | Yamada et al. |
| 9,210,675 B2 | 12/2015 | Dinan |
| 9,258,747 B2 | 2/2016 | Sivanesan et al. |
| 9,374,151 B2 | 6/2016 | Xiong et al. |
| 9,554,305 B2 | 1/2017 | Moustafa et al. |
| 9,648,514 B2 | 5/2017 | Blankenship et al. |
| 9,674,852 B2 | 6/2017 | Heo |
| 9,693,338 B2 | 6/2017 | Zhao et al. |
| 9,992,781 B2 | 6/2018 | Chatterjee et al. |
| 2003/0013443 A1 | 1/2003 | Willars et al. |
| 2007/0291733 A1 | 12/2007 | Doran et al. |
| 2008/0080428 A1 | 4/2008 | Jappila et al. |
| 2008/0189360 A1 | 8/2008 | Kiley et al. |
| 2008/0205379 A1 | 8/2008 | Naqvi |
| 2009/0016249 A1 | 1/2009 | Li et al. |
| 2009/0196277 A1 | 8/2009 | Horn et al. |
| 2009/0270098 A1 | 10/2009 | Gallagher et al. |
| 2011/0080825 A1 | 4/2011 | Dimou et al. |
| 2011/0164562 A1 | 7/2011 | Qiu et al. |
| 2011/0280212 A1 | 11/2011 | Lv |
| 2012/0020291 A1 | 1/2012 | Nasielski et al. |
| 2012/0063298 A1 | 3/2012 | Yi et al. |
| 2012/0088498 A1 | 4/2012 | Xiao et al. |
| 2012/0202557 A1 | 8/2012 | Olofsson et al. |
| 2012/0218970 A1 | 8/2012 | Westberg et al. |
| 2012/0236776 A1 | 9/2012 | Zhang et al. |
| 2012/0276897 A1 | 11/2012 | Kwon et al. |
| 2012/0327821 A1 | 12/2012 | Lin et al. |
| 2012/0327894 A1 | 12/2012 | Axmon et al. |
| 2013/0022023 A1 | 1/2013 | Aydin |
| 2013/0023269 A1 | 1/2013 | Wang et al. |
| 2013/0023302 A1 | 1/2013 | Sivanesan et al. |
| 2013/0044690 A1 | 2/2013 | Shaheen |
| 2013/0051507 A1 | 2/2013 | Jantunen et al. |
| 2013/0083779 A1* | 4/2013 | Ahn ..................... H04W 72/04 370/336 |
| 2013/0109301 A1 | 5/2013 | Hakola et al. |
| 2013/0121249 A1 | 5/2013 | Ji et al. |
| 2013/0183963 A1 | 7/2013 | Turtinen et al. |
| 2013/0183974 A1 | 7/2013 | Johansson et al. |
| 2013/0332559 A1 | 12/2013 | Mas et al. |
| 2014/0098761 A1 | 4/2014 | Lee et al. |
| 2014/0148174 A1 | 5/2014 | Teyeb et al. |
| 2014/0219248 A1 | 8/2014 | Reddiboyana et al. |
| 2014/0242963 A1 | 8/2014 | Novlan et al. |
| 2014/0301305 A1 | 10/2014 | Xu et al. |
| 2014/0302821 A1 | 10/2014 | Hwang et al. |
| 2014/0335869 A1 | 11/2014 | Choi et al. |
| 2015/0043420 A1 | 2/2015 | Xiong et al. |

(56) References Cited

U.S. PATENT DOCUMENTS

| | | | |
|---|---|---|---|
| 2015/0049707 A1 | 2/2015 | Vajapeyam et al. | |
| 2015/0078335 A1 | 3/2015 | Sivanesan et al. | |
| 2015/0117183 A1 | 4/2015 | Heo et al. | |
| 2015/0195750 A1 | 7/2015 | Sivanesan et al. | |
| 2015/0195865 A1 | 7/2015 | Lee et al. | |
| 2015/0201337 A1 | 7/2015 | Hwang et al. | |
| 2015/0207672 A1 | 7/2015 | Xu et al. | |
| 2015/0223258 A1 | 8/2015 | Jung et al. | |
| 2015/0244429 A1 | 8/2015 | Zhang et al. | |
| 2015/0263836 A1 | 9/2015 | Kim | |
| 2015/0312005 A1 | 10/2015 | Huang et al. | |
| 2015/0327162 A1 | 11/2015 | Lee et al. | |
| 2015/0341877 A1* | 11/2015 | Yi | H04W 56/00 370/350 |
| 2015/0373609 A1 | 12/2015 | Kim et al. | |
| 2016/0029333 A1* | 1/2016 | Seo | H04W 76/14 370/350 |
| 2016/0044567 A1 | 2/2016 | Baghel et al. | |
| 2016/0205612 A1 | 7/2016 | Seo et al. | |
| 2016/0219541 A1 | 7/2016 | Chatterjee et al. | |
| 2016/0227580 A1 | 8/2016 | Xiong et al. | |
| 2016/0234847 A1 | 8/2016 | Zhang et al. | |
| 2016/0242128 A1 | 8/2016 | Loehr et al. | |
| 2016/0249259 A1 | 8/2016 | Park et al. | |
| 2016/0255602 A1 | 9/2016 | Zaus | |
| 2016/0255615 A1 | 9/2016 | Chatterjee et al. | |
| 2016/0255640 A1 | 9/2016 | Zitzmann et al. | |
| 2016/0295614 A1 | 10/2016 | Lee et al. | |
| 2016/0359548 A1 | 12/2016 | Xiong | |
| 2017/0273095 A1 | 9/2017 | Heo et al. | |

FOREIGN PATENT DOCUMENTS

| | | |
|---|---|---|
| CN | 105379148 A | 3/2016 |
| CN | 105556994 A | 5/2016 |
| CN | 105557051 A | 5/2016 |
| CN | 105557052 A | 5/2016 |
| CN | 105594140 A | 5/2016 |
| CN | 105594266 A | 5/2016 |
| CN | 105612786 A | 5/2016 |
| CN | 106411490 A | 2/2017 |
| EP | 2472950 A1 | 7/2012 |
| EP | 3031147 A1 | 6/2016 |
| EP | 3047679 A1 | 7/2016 |
| EP | 3063883 A1 | 9/2016 |
| EP | 3063982 A1 | 9/2016 |
| EP | 3064012 A1 | 9/2016 |
| JP | 2010258715 A | 11/2010 |
| JP | 2016531533 A | 10/2016 |
| JP | 6162330 B2 | 7/2017 |
| KR | 1020090124788 B2 | 12/2009 |
| KR | 1020110038571 A | 4/2011 |
| KR | 1020160039235 A | 4/2016 |
| WO | WO-2011120853 A1 | 10/2011 |
| WO | WO-2012150815 A2 | 11/2012 |
| WO | WO-2012159270 A1 | 11/2012 |
| WO | WO-2013104413 A1 | 7/2013 |
| WO | WO-2013108048 A1 | 7/2013 |
| WO | WO-2015021320 A1 | 2/2015 |
| WO | WO-2015042100 A1 | 3/2015 |
| WO | WO-2015065619 A1 | 5/2015 |
| WO | WO-2015065768 A1 | 5/2015 |
| WO | WO-2015065881 A1 | 5/2015 |
| WO | WO-2015065947 A1 | 5/2015 |
| WO | WO-2015066281 A1 | 5/2015 |
| WO | WO-2015066476 A1 | 5/2015 |

OTHER PUBLICATIONS

"[DRAFT] LS on KeNB* generation in case of MFBI", R2-131153, 3GPP TSG RAN WG2 Meeting #80 bis, (May 24, 2013), 1 pg.
"3rd Generation Partnership Project; Technical Specification Group Core Network and Terminals; General Packet Radio Service (GPRS); Serving GPRS Support Node (SGSN) Visitors Location Register (VLR); Gs interface layer 3 specification (Release 11)", 3GPP TS 29.018, V11.6.0, (Mar. 2013), 62 pgs.
"3rd Generation Partnership Project; Technical Specification Group Core Network and Terminals; Mobile radio interface Layer 3 specification; Core network protocols; Stage 3 (Release 11)", 3GPP TS 24.008, V 11.8.0, (Sep. 2013), 677 pgs.
"3rd Generation Partnership Project; Technical Specification Group Core Network and Terminals; Non-Access-Stratum (NAS) protocol for Evolved Packet System (EPS); Stage 3 (Release 11)", 3GPP TS 24.301, V11.8.0, (Sep. 2013), 345 pgs.
"3rd Generation Partnership Project; Technical Specification Group Services and System Aspects; Circuit Switched (CS) fallback in Evolved Packet System (EPS); Stage 2 (Release 12)", 3GPP Standard; 3GPP TS 23.272, 3rd Generation Partnership Project (3GPP), Mobile Competence Centre, F-06921 Sophia-Antipolis Cedex, (Sep. 11, 2013), 1-97.
"U.S. Appl. No. 13/659,655, Response filed Jul. 14, 2016 to Final Office Action dated May 20, 2016", 17 pgs.
"U.S. Appl. No. 14/279,562, Notice of Allowance dated Sep. 4, 2015", 9 pgs.
"U.S. Appl. No. 14/311,938, Examiner Interview Summary dated Jan. 22, 2016", 3 pgs.
"U.S. Appl. No. 14/311,938, Non Final Office Action dated Nov. 2, 2015", 14 pgs.
"U.S. Appl. No. 14/311,938, Notice of Allowance dated Feb. 29, 2016", 5 pgs.
"U.S. Appl. No. 14/311,938, Response filed Jan. 18, 2016 to Non Final Office Action dated Nov. 2, 2015", 7 pgs.
"U.S. Appl. No. 14/491,639, Final Office Action dated Oct. 31, 2016", 19 pgs.
"U.S. Appl. No. 14/491,639, Non Final Office Action dated Apr. 8, 2016", 16 pgs.
"U.S. Appl. No. 14/491,639, Notice of Allowance dated Jan. 20, 2017", 6 pgs.
"U.S. Appl. No. 14/491,639, PTO Response to Rule 312 Communication dated May 11, 2017", 2 pgs.
"U.S. Appl. No. 14/491,639, Response filed Jan. 3, 2017 to Final Office Action dated Oct. 31, 2016", 10 pgs.
"U.S. Appl. No. 14/491,639, Response filed Aug. 8, 2016 to Non Final Office Action dated Apr. 8, 2016", 9 pgs.
"U.S. Appl. No. 14/659,655, Corrected Notice of Allowance dated Dec. 15, 2016", 2 pgs.
"U.S. Appl. No. 14/659,655, Final Office Action dated May 20, 2016", 10 pgs.
"U.S. Appl. No. 14/659,655, Non Final Office Action dated Jan. 21, 2016", 10 pgs.
"U.S. Appl. No. 14/659,655, Notice of Allowance dated Aug. 3, 2016", 8 pgs.
"U.S. Appl. No. 14/659,655, Preliminary Amendment filed Mar. 18, 2015", 47 pgs.
"U.S. Appl. No. 14/916,843, Non Final Office Action dated Jun. 23, 2017", 33 pgs.
"U.S. Appl. No. 14/917,154, Non Final Office Action dated Jun. 29, 2017", 7 pgs.
"U.S. Appl. No. 14/917,451, Non Final Office Action dated Jul. 25, 2017", 16 pgs.
"U.S. Appl. No. 15/026,174, Non Final Office Action dated May 19, 2017", 15 pgs.
"U.S. Appl. No. 15/026,174, Response filed Jul. 20, 2017 to Non Final Office Action dated May 19, 2017", 9 pgs.
"U.S. Appl. No. 15/026,753, Corrected Notice of Allowance dated Aug. 2, 2017", 2 pgs.
"U.S. Appl. No. 15/026,753, Notice of Allowance dated Jul. 19, 2017", 12 pgs.
"U.S. Appl. No. 15/026,788, Non Final Office Action dated Apr. 11, 2017", 21 pgs.
"U.S. Appl. No. 15/026,788, Notice of Allowance dated Aug. 31, 2017", 7 pgs.
"U.S. Appl. No. 15/026,788, Preliminary Amendment filed Apr. 1, 2016", 9 pgs.
"U.S. Appl. No. 15/026,788, Response filed Jul. 11, 2017 to Non Final Office Action dated Apr. 11, 2017", 11 pgs.

(56) References Cited

OTHER PUBLICATIONS

"U.S. Appl. No. 15/186,832, Preliminary Amendment filed Aug. 17, 2016", 8 pgs.
"U.S. Appl. No. 14/659,655, Response filed Apr. 20, 2016 to Non Final Office Action dated Jan. 21, 2016", 31 pgs.
"Backwards compatibility issues with the approved CRs 24.301-1532r1 (C1-123946) and 24.008-2296r1 (C1-124701)", 3GPP Draft; C1-132127-Discussion-Periodic-Update. 3rd Generation Partnership Project, Retrieved from the Internet: URL: <http://www.3gpp.org/ftp/tsg t=ct/WG1_mm-cc-sm_ex-CN1/TSGC1_83_Chengdu/docs/>, (May 13, 2013), 3 pgs.
"Beacon Channel Design for D2D,", Ericsson, 3GPP TSG-RAN WG1#74b R1-134723, 3GPP, (Sep. 27, 2013), 8 pgs.
"Chinese Application Serial No. 201480051969.X, Voluntary Amendment Filed on Jun. 28, 2017", w/English Claims, 22 pgs.
"Chinese Application Serial No. 2016-544365, Office Action dated Mar. 14, 2017", w. English Translation, 10 pgs.
"Clarification of ISR activation condition for NMO II RAU and Periodic RAU", 3GPP Draft; S2-120327 REV4-S2-120098 23272CR0720 CSFB RAU and ISR REL8 REV04. 3rd Generation Partnership Project (3GPP), Mobile, (Jan. 24, 2012), 2 pgs.
"Clarification of ISR activation condition for Periodic RAU", 3GPP Draft; S2-120097 Clarification of ISR Activation Disc, 3rd-Generation Partnership Project, Mobile Competence Centr, (Jan. 11, 2012), 5 pgs.
"Comparison of the UP Alternatives", R2-132338, 3GPP TSG-RAN WG2 Meeting #83, Barcelona, Spain,NSN, Nokia Corporation, NTT DOCOMO, Inc., Samsung, (Aug. 2013), 5 pgs.
"Coverage enhancement of PRACH for low cost MTC", Intel Corporation: 3GPP Draft; RI-135104 Intel MTC Prach, 3rd Generation Partnership Project (3GPP), Mobile Competence Centre ; 650, Route Des Lucioles ; F-06921 Sophia-Antipolis Cedex ; France, (Nov. 2, 2013), 8 pgs.
"Coverage Improvement for PRACH", Intel Corporation: 3GPP Draft; RI-140115 Intel MTC Prach 3rd Generation Partnership Project (3GPP),Mobile Competence Centre ; 650, Route Des Lucioles ; F-06921 Sophia-Antipolis Cedex ; France, [Online] Retrieved from the Internet : <http://www.3g pp.org /ftp/tsgran/WGIRLI/TSGRI_76/Docs/>, (Feb. 1, 2014), 9 pgs.
"D2D synchronization—with network coverage", 3GPP TSG-RAN, WG1 Meeting #74bis, R1-134537, (Oct. 11, 2013), 4 pgs.
"Data split options and considerations on U-plane protocol architecture for dual-connectivity", R2-131054, 3GPP TSG-RAN WG2 Meeting #81bis, Chicago, USA Nokia Siemens Networks, (Apr. 2013), 9 pgs.
"Discovery Mode and Data Flow for D2D Discovery", CATT, 3GPP TSGG-RAN WG2#83bis R2-133217, 3GPP, (Sep. 27, 2013), 4 pgs.
"Discussion on Multi-level Prach Coverage Enhancement", R1-140616 3GPP TSG RAN WG1 Meeting #76 NTT DOCOMO, (Feb. 2014), 1-6.
"Discussion on PRACH Coverage Enhancement for Low Cost MTC", Intel Corporation: 3GPP Draft; R1-132930—Discussion on PRACH Coverage Enhancement for Low Cost MTC, 3rd Generation Partnership Project (3GPP), Mobile Competence Centre ; 650, Route Deslucioles ; F-06921 Sophia-Antipo vol. RAN WG1, No. Barcelona, Spain, (Aug. 10, 2013), 7 pgs.
"Discussion on Public Safety UE-Network Relays", 3GPP TSG RAN WG1 Meeting #74bis R1-134803, (Oct. 2, 2013).
"Discussion on Resource Allocation for D2D Discovery", ZTE, 3GPP TSG-RAN WG1#74b R1-134309, 3GPP, (Sep. 28, 2013), 11 pgs.
"European Application Serial No. 14834710.7, Extended European Search Report dated Mar. 22, 2017", 9 pgs.
"European Application Serial No. 14846552.9, Extended European Search Report dated May 17, 2017", 7 pgs.
"European Application Serial No. 14856919.7, Extended European Search Report dated May 17, 2017", 8 pgs.
"European Application Serial No. 14857392.6, Extended European Search Report dated Jun. 20, 2017", 10 pgs.
"European Application Serial No. 14858430.3, Extended European Search Report dated Mar. 7, 2017", 9 pgs.
"European Application Serial No. 14858666.2, Extended European Search Report dated Mar. 7, 2017", 8 pgs.
"European Application Serial No. 14858860.1, Extended European Search Report dated Mar. 28, 2017", 9 pgs.
"European Application Serial No. 14859145.6, Extended European Search Report dated Mar. 22, 2017", 8 pgs.
"Evolved Universal Terrestrial Radio Access (E-UTRA); Multiplexing and channel coding", 3GPP TS 36.212 version 8.8.0 Release 8 LTE, (Jan. 2010), 62 pgs.
"Evolved Universal Terrestrial Radio Access (E-UTRA); Physical channels and modulation", 3GPP TS 36.211 version 9.1.0 Release 9 LTE, (Apr. 2010), 87 pgs.
"Evolved Universal Terrestrial Radio Access (E-UTRA); Physical layer procedures", 3GPP TS 36.213 V11.0.0 3rd Generation Partnership Project;Technical Specification Group Radio Access Network;, (Sep. 2012), 143 pgs.
"Evolved Universal Terrestrial Radio Access (E-UTRA); Radio Resource Control (RRC); Protocol specification", 3GPP TS 36.331 version 8.6.0 Release 8 ETSI, (Jul. 2009), 211 pgs.
"Further considerations on MTC coverage enhancement", Motorola Mobility, RI-132467, 3GPP TSG RAN WG1 Meeting #73, Fukuoka, Japan, (May 20-24, 2013), 1-3.
"Further discussion on CSFB with ISR", 3GPP Draft; S2-120825 WAS S2-120739 CSFB ISE Periodicr, 3rd Generation Partnership Project, Mobile Competence Centr, (Feb. 3, 2012), 26 pgs.
"Further discussion on resource allocation for D2D discovery", R1-134116 3GPP TSG RAN WG1 Meeting #74bis CATT, (Oct. 11, 2013), 1-6.
"HiSilicon", Huawei,D2D discovery message size, 3GPP TSG-RAN WG1#74b R1-134075, 3GPP, (Sep. 28, 2013), 4 pgs.
"Impacts of Splitting a Single EPS Bearer between Two (or more) eNBs", R2-131401, 3GPP TSG RAN WG2 Meeting #81bis. Chicago, USA,Intel Corporation, (Apr. 2013), 9 pgs.
"Indian Application Serial No. 201647004844, Voluntary Amendment filed on Jul. 19, 2017", (W/ English Claims), 17 pgs.
"Indian Application Serial No. 201647004844, Voluntary Amendment dated Aug. 3, 2016", W/ English Translation, 14 pgs.
"Inter-corresponding sets of resources for D2D discovery", R1-134365 3GPP TSG RAN WG1 Meeting #74bis HTC, (Oct. 11, 2013), 1-2.
"International Application Serial No. PCT/US2014/050214, International Preliminary Report on Patentability dated Feb. 18, 2016", 7 pgs.
"International Application Serial No. PCT/US2014/050214, International Search Report dated Nov. 19, 2014", 4 pgs.
"International Application Serial No. PCT/US2014/050214, Written Opinion dated Nov. 19, 2014", 5 pgs.
"International Application Serial No. PCT/US2014/056003, International Preliminary Report on Patentability dated Mar. 31, 2016", 7 pgs.
"International Application Serial No. PCT/US2014/056003, International Search Report dated Dec. 16, 2014", 4 pgs.
"International Application Serial No. PCT/US2014/056003, Written Opinion dated Dec. 16, 2014", 5 pgs.
"International Application Serial No. PCT/US2014/056909, International Preliminary Report on Patentability dated May 12, 2016", 6 pgs.
"International Application Serial No. PCT/US2014/056909, International Search Report dated Dec. 26, 2014", 3 pgs.
"International Application Serial No. PCT/US2014/056909, Written Opinion dated Dec. 26, 2014", 4 pgs.
"International Application Serial No. PCT/US2014/061569, International Preliminary Report on Patentability dated May 12, 2016", 8 pgs.
"International Application Serial No. PCT/US2014/061569, International Search Report dated Jan. 16, 2015", 3 pgs.
"International Application Serial No. PCT/US2014/061569, Written Opinion dated Jan. 16, 2015", 6 pgs.
"International Application Serial No. PCT/US2014/062349, International Preliminary Report on Patentability dated May 12, 2016", 10 pgs.

(56) References Cited

OTHER PUBLICATIONS

"International Application Serial No. PCT/US2014/062349, International Search Report dated Jan. 26, 2015", 4 pgs.
"International Application Serial No. PCT/US2014/062349, Written Opinion dated Jan. 26, 2015", 8 pgs.
"International Application Serial No. PCT/US2014/062533, International Preliminary Report on Patentability dated May 12, 2016", 8 pgs.
"International Application Serial No. PCT/US2014/062533, International Search Report dated Jan. 21, 2015", 3 pgs.
"International Application Serial No. PCT/US2014/062533, Written Opinion dated Jan. 21, 2015", 6 pgs.
"International Application Serial No. PCT/US2014/063080, International Preliminary Report on Patentability dated May 12, 2016", 7 pgs.
"International Application Serial No. PCT/US2014/063080, International Search Report dated Feb. 12, 2015", 4 pgs.
"International Application Serial No. PCT/US2014/063080, Written Opinion dated Feb. 12, 2015", 5 pgs.
"International Application Serial No. PCT/US2014/063434, International Preliminary Report on Patentability dated May 12, 2016", 10 pgs.
"International Application Serial No. PCT/US2014/063434, International Search Report dated Feb. 16, 2015", 4 pgs.
"International Application Serial No. PCT/US2014/063434, Written Opinion dated Feb. 16, 2015", 8 pgs.
"Japanese Application Serial No. 2016-516873, Office Action dated Feb. 7, 2017", (W/ English Translation), 10 pgs.
"Japanese Application Serial No. 2016-516873, Response Filed Apr. 28, 2017 to Office Action dated Feb. 7, 2017", (W/ English Claims), 15 pgs.
"Korean Application Serial No. 10-2016-7004885, Office Action dated Jul. 3, 2017", w/English Translation, 8 pgs.
"Korean Application Serial No. 10-2016-7004885, Response filed Sep. 4, 2017 to Office Action dated Jul. 3, 2017", (W/ English Claims), 19 pgs.
"Korean Application Serial No. 10-2016-7008440, Office Action dated Jul. 18, 2017", (W/ English Translation), 5 pgs.
"Korean Application Serial No. 10-2016-7008440, Response Filed Sep. 18, 2017 to Office Action dated Jul. 18, 2017", (W/ English Claims), 14 pgs.
"Korean Application Serial No. 10-2016-7008440, Voluntary Amendment Filed on Jul. 3, 2017", (W/ English Claims), 26 pgs.
"LS on KeNB* generation in case of MFB", TSG RAN WG2: 3GPP Draft; R2-132224 (Reply LS on KENB and MFBI), 3rd Generation Partnership Project (3GPP), Mobile Competence Centre; 650, Route Des Lucioles; F-06921 Sophia-Antipolis Cedex; France, vol. RAN WG2, No. Fukuoka, Japan, (May 23, 2013), 2 pgs.
"LS on signalling of multiple frequency band indicators; prioritization of frequency bands supported", R2-122009, 3GPP TSG RAN WG2 Meeting #78 Ericsson, (May 25, 2012), 1 pg.
"On D2D Discovery Transmission Timing", Intel Corporation, 3GPP Draft; R1-135121-Intel-Discovery Transmission Timing, 3rd Generation Partnership Project (3GPP), Mobile Competence Centre; 650, Route Des Lucioles; F-06921 Sophia-Antipolis Cedex ; France,, [Online] retrieved from the internet: <:http://www.3gpp.org/ftp/tsg_ran/WG1_RL1/TSGR1_75/ Docs/>, 7 pgs.
"On MFBI and EARFCN extension", Renesas Mobile Europe LTD: 3GPP Draft; GP-130569, 3rd Generation Partnership Project (3GPP), Mobile Competence Centre; 650, Route Deslucioles; F-06921 Sophia-Antipolis Cedex; France vol. TSG GERAN, No. Sofia, Bulgaria, (Aug. 21, 2013), 1-5.
"On MFBI and EARFCN extension", GP-130431 3GPP TSG GERAN#58 Renesas Mobile Europe Ltd.,, (May 2013), 1-5 pgs.
"On Resource Allocation and System Operation for D2D Discovery", R1-135119 3GPP TSG RAN WG1 Meeting #75 Intel Corporation, (Nov. 15, 2013), 1-6.
"On Resource Allocation and System Operation for D2D Discovery", Intel Corporation, 3GPP Draft; R1-134141—Intel—Discovery Resource Allocation, Centre ; 650, Route Des Lucioles ; F-06921 Sophia-Antipolis Cedex ; France vol. RAN WG1, No. Guangzhou, China; 20131007 - 2013101128, [Online] retrieved from the Internet: <:http://www.3gpp.org/ftp/tsg_ran/WG1_RL1/TSGR1_74b/Docs/>, (Oct. 11, 2013), 10 pgs.
"On Support of Inter-cell D2D Discovery", Intel Corporation, 3GPP Draft; R1-140135-Intel-Inter-Cell Discovery, 3rd Generation Partnership Project (3GPP), Mobile Competence Centre ; 650, Route Des Lucioles ; F-06921 Sophia-Antipolis Cedex ; France, [Online] retrieved from the internet: <:http://www.3gpp.org/ftp/tsg_ran/WG1_RL1/TSGR1_76/Docs/>, (Feb. 1, 2014), 6 pgs.
"PBCH Coverage Enhancement", Qualcomm Inc, RI-131397, 3GPP TSG-RAN WG1 Meeting #72bis, Chicago. USA, [Online]. Retrieved from the Internet: <URL: http://www.3gpp.org/ftp/tsg_ran/WGI_RL1/TSGRI_72b/Docs/R1-131397.zip>, (Apr. 15-19, 2013), 3 pgs.
"PBCH Coverage Extension for MTC Devices", ITRI, R1-132256. 3GPP TSG RAN WG1 Meeting #73, Fukuoka. Japan, [Online]. Retrieved from the Internet: <URL: http://www.3gpp.org/ftp/tsg_ran/WG1_RL1/TSGRI_73/Docs/R1-32256.zip>, (May 20-24, 2013), 1-3.
"PBCH coverage improvement for low-cost MTC UEs", CATT, R1-130982, 3GPP TSG-RAN WG1 Meeting #72bis, Chicago, USA, [Online]. Retrieved from the Internet: <URL: http://www.3gpp.org/ftp/tsg_ran/WGI_RLI/TSGRI_72b/Docs/R1-130982.zip>, (Apr. 15-19, 2013), 1-4.
"Physical Random Access Channel Coverage Enhancement", R1-134303 TSG RAN WG1 Meeting #74bis, Guangzhou, China ZTE, (Sep. 28, 2013), 1-16.
"PRACH coverage enhancement for MTC UEs", R1-140278 3GPP TSG RAN WG1 Meeting #76 ZTE, (Feb. 2014), 1-8.
"PRACH resource multiplexing to support low cost MTC and coverage enhancement", R1-140027 3GPP TSG RAN WG1 Meeting #76, (Feb. 2014), 1-6.
"Remaining details of D2D discovery resource allocation", Intel Corporation, 3GPP Draft; R1-143766_Intel_DISC0VERYRA, 3rd Generation Partnership Project (3GPP), Mobile Competence Centre; 650, Route Des Lucioles: F06921 Sophia-Antipolis Cedex; France, XP050875087, [Online] retrieved from the internet: <:http://www.3gpp.orgiftp/Meetings_3GPP_SYNC/RANI/Docs/>, (Oct. 5, 2014), 8 pgs.
"Resource allocation for D2D communication", CATT, 3GPP TSG-RAN WG1#74b R1-134113, 3GPP, (Sep. 28, 2013), 2 pgs.
"Resource allocation for D2D discovery", Alcatel-Lucent Shanghai Bell, Alcatel-Lucent, 3GPP TSG-RAN WG1#74b R1-134232, 3GPP, (Sep. 28, 2013), 2 pgs.
"Resource allocation for D2D discovery", Intel Corporation, 3GPP TSG-RAN WG2#83bis R2-133512, 3GPP, (Sep. 28, 2013), 4 pgs.
"Resource Allocation for D2D Discovery", R1-134232, 3GPP TSG RAN WG1 Meeting #74bis Alcatel-Lucent Shanghai Bell, Alcatel-Lucent, (Oct. 11, 2013), 1-2.
"Uplink scheduling and BSRs with dual connectivity", R2-133412, 3GPP TSG-RAN WG2 Meeting #83bis, Ljubljana,Slovenia Ericsson, (Oct. 2013), 3 pgs.
Alacatel, Lucent, "Feasibility of coverage extension of physical Channels for MTC devices", 3GPP Draft; R1-130462—REL-12 MTC Coverage—Coverage EXT PHY Channels V0.3, 3rd Generation Partnership Project (3GPP), Mobile Competence Centre; 650, Route Des Lucioles ; F-06921 Sophia-Antipolis C, [Online] retrieved from the internet: <http://www.3gpp.org/ftp/tsg_ran/WG1_RL1/TSGR1_72/Docs/>, (Jan. 19, 2013), 7 pgs.
Asustek, "Method of resource allocation for D2D discovery", 3GPP Draft; RI-134638 Method of Resource Allocation for D2D Discovery, 3rd Generation Partnership Project (3GPP), Mobile Competence Centre ; 650, Route Des Lucioles ; F-06921 Sophia-Antipolis Cedex, XP050717720, [Online] retrieved from the Internet: <:http://www.3gpp.org/ftp/tsg_ran/WGI_RLI/TSGRI_74b/Docs/>, (Sep. 28, 2013), 9 pgs.
Ericsson, et al., "Coverage enhancements for MTC—System informa", 3GPP Draft; R1-131680 Coverage Enhancements for MTC System Information, 3rd Generation Partnership Project (3GPP), Mobile Competence Centre; 650, Route Des Lucioles; F-06921 Sophia-Antipolis Cedex, [Online] retrieved from the internet: <http ://www.3gpp.org/ftp/tsg_ran/WG 1 _RL1 /TSG R1 _72b/Docs/>, (Apr. 16, 2013), 8 pgs.

(56) References Cited

OTHER PUBLICATIONS

Huawei, et al., "Discussion on PRACH coverage improvement and mechanism for determining the amount of needed coverage improvement", 3GPP Draft; RI-134054, 3rd Generation Partnership Project (3GPP), Mobile Competence Centre; 650, Route Des Lucioles; F-06921 Sophia-Antipolis Cedex, (Sep. 28, 2013), 6 pgs.
Huawei, et al., "DRB configuration and switch in dual Connectivity", 3GPP Draft; R2-142062, 3rd Generation Partnership Project (3GPP), Mobile Competence Centre; 650, Route Des Lucioles; F-06921 Sophia-Antipolis Cedex; France, vol. RAN WG2, No. Seoul, South Korea; 20140519-20140523, [Online] retrieved from the internet: <http://www.3gpp.org/ftp/tsg_ran/WG2_RL2/TSGR2_86/Docs/>, (May 10, 2014), 5 pgs.
Intel Corporation, "On D2D Discovery Transmission Timing", 3GPP TSG-RAN, WG1#75, R1-135955, [Online] retrieved from the internet<http://www.3gpp.org/ftp/tsg_ran/WG1_RL1/TSGR1_75/Docs/R1-135955>, (Nov. 15, 2013), 7 pgs.
Nokia, et al., "D2D Discovery Signal", 3GPP Draft; R1-134538, 3rd Generation Partnership Project (3GPP), Mobile Competence Centre; 650, Route Des Lucioles; F-06921 Sophia-Antipolis Cedex; France [Online] retrieved from the internet: <:http://www.3gpp.org/ftp/tsg_ran/WG1_RL1/TSGR1_74b/Docs/>, (Sep. 28, 2013), 7 pgs.
Rapportuer, "Introduction of Dual Connectivity (RAN3 topics)", 3GPP Draft; R3-141480-DC-Stage2-01, 3rd Generation Partnership Project (3GPP), Mobile Competence Centre; 650, Route Des Lucioles; F-06921 Sophia-Antipolis Cedex; France, vol.RAN WG3, No. Seoul, South Korea; 20140519-20140523, [Online] retrieved from the Internet:<:http://www.3gpp.org/ftp/tsg_ran/WG3_lu/TSGR3_84/Docs/>, (May 24, 2014), 62 pgs.
Tao, Yun Wang, et al., "Method and system for processing joint position service Gs interface fault", (Aug. 13, 2008), 6 pgs.
"U.S. Appl. No. 14/917,154, Corrected Notice of Allowance dated Mar. 22, 2018", 2 pgs.
"U.S. Appl. No. 15/026,174, PTO Response to Rule 312 Communication dated Apr. 3, 2018", 2 pgs.
"U.S. Appl. No. 15/614,208, Notice of Allowability dated Mar. 16, 2018", 2 pgs.
"U.S. Appl. No. 15/614,208, Notice of Allowance dated Mar. 7, 2018", 8 pgs.
"U.S. Appl. No. 15/730,287, Corrected Notice of Allowance dated Apr. 11, 2018", 2 pgs.
"U.S. Appl. No. 15/730,287, Notice of Allowability dated May 15, 2018", 2 pgs.
"U.S. Appl. No. 15/862,181, Notice of Allowance dated May 4, 2018", 18 pgs.
"Chinese Application Serial No. 201480039337.1, Response filed Apr. 20, 2018 to Office Action dated Dec. 5, 2017", W/ English Claims), 31 pgs.
"Chinese Application Serial No. 201480053377.1, Office Action dated Feb. 24, 2018", w/English Translation, 18 pgs.
"European Application Serial No. 17170538.7, Response Filed Apr. 11, 2018 to Extended European Search Report dated Sep. 12, 2017", 17 pgs.
"European Application Serial No. 18159077.9, Extended European Search Report dated Mar. 27, 2018", 8 pgs.
"LS on KeNB generation in case of MFBI", 3GPP TSG RAN WG3 Meeting #80 Fuouka R3-131126, (May 20-24, 2013).
"3GPP TSG RAN WG1 Meeting #74 R1-132940", Source: Intel Corporation Title: On D2D Communication Design Aspects in Public Safety Scenarios Agenda item: 7.2.8.1, (Aug. 2013), 9 pgs.
"3GPP TSG RAN WG1 Meeting #74 R1-132995", Agenda Item: 7.2.8.2 Source: Alcatel-Lucent Shanghai Bell, Alcatel-Lucent Title: D2D Discovery design for groupcast, broadcast, and relay, (Aug. 2013), 6 pgs.
"3GPP TSG RAN WG1 Meeting #74 R1-133030", Source: CATT Title: Considerations on D2D communication Agenda Item: 7.2.8.1, (Aug. 2013), 6 pgs.
"3GPP TSG RAN WG1 Meeting #74bis R1-134416", Agenda item: 7.2.8.2.1 Source: LG Electronics Title: Discussion on Inter-cell D2D discovery, (Oct. 2013), 5 pgs.
"U.S. Appl. No. 15/026,174, Examiner Interview Summary dated Jan. 10, 2018", 3 pgs.
"U.S. Appl. No. 15/026,174, Final Office Action dated Nov. 3, 2017", 21 pgs.
"U.S. Appl. No. 15/026,174, Notice of Allowance dated Feb. 1, 2018", 18 pgs.
"U.S. Appl. No. 15/026,174, Response filed Jan. 2, 2017 to Final Office Action dated Nov. 3, 2017", 13 pgs.
"European Application Serial No. 14858430.3, Response Filed Sep. 25, 2017 to Extended European Search Report dated Feb. 7, 2017", 13 pgs.
"Japanese Application Serial No. 2016-544365, Response Filed Jun. 13, 2017 to Office Action dated Mar. 14, 2017", (W/ English Claims), 16 pgs.
"Japanese Application Serial No. 2017-227978, Voluntary Amendment filed on Jan. 5, 2018", (W/ English Claims), 8 pgs.
"Chinese Application Serial No. 201480053377.1, Response filed Jul. 5, 2018 to Office Action dated Feb. 24, 2018", W/ English Claims, 27 pgs.
"Japanese Application Serial No. 2017-227978, Notification of Reasons for Refusal dated Sep. 4, 2018", W/ English Translation, 13 pgs.
"Korean Application Serial No. 10-2018-7009270, Response filed Jul. 19, 2018 to Notice of Preliminary Rejection dated May 19, 2018", W/ English Claims, 24 pgs.
Ericsson, "Synchronization Procedures for D2D Discovery and Communication", 3GPP TSG-RAN WG1#74bis, 3GPP, Oct. 11, 2013, R1-134720, [Online] Retrieved from the internet:<http://www.3gpp.org/ftp/tsg_ran/WG1_RL1/TSGR1_74b/Docs/R1-134720.zip>, (Oct. 11, 2013), 6 pgs.

* cited by examiner

SIGNALING FOR INTER-CELL D2D DISCOVERY IN AN LTE NETWORK

PRIORITY CLAIMS

This application is a continuation of U.S. patent application Ser. No. 15/026,174, which is a U.S. National Stage Filing under 35 U.S.C. 371 from International Application No. PCT/US2014/061569, filed on Oct. 21, 2014, and published as WO 2015/065768 on May 7, 2015, which claims the benefit of priority to U.S. Provisional Patent Application Ser. No. 61/898,425, filed Oct. 31, 2013, both of which are incorporated herein by reference in their entirety.

TECHNICAL FIELD

Embodiments pertain to wireless communications. Some embodiments relate to 3GPP LTE (Long Term Evolution) networks, Sonic embodiments relate to direct device-to-device (D2D) communication. Some embodiments relate to device discovery in LTE networks.

BACKGROUND

Proximity-based applications and services represent a fast growing social and technological trend that may have a major impact on evolution of cellular wireless/mobile broadband technologies. These services are based on the awareness of two devices or two users being close to each other and may include such applications as public safety operations, social networking, mobile commerce, advertisement, gaming, etc. Device to device (D2D) discovery is the first step to enable D2D service. There are many unresolved issues with respect to device discovery for D2D communication particularly for inter-cell Proximity Service (ProSe) D2D discovery.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
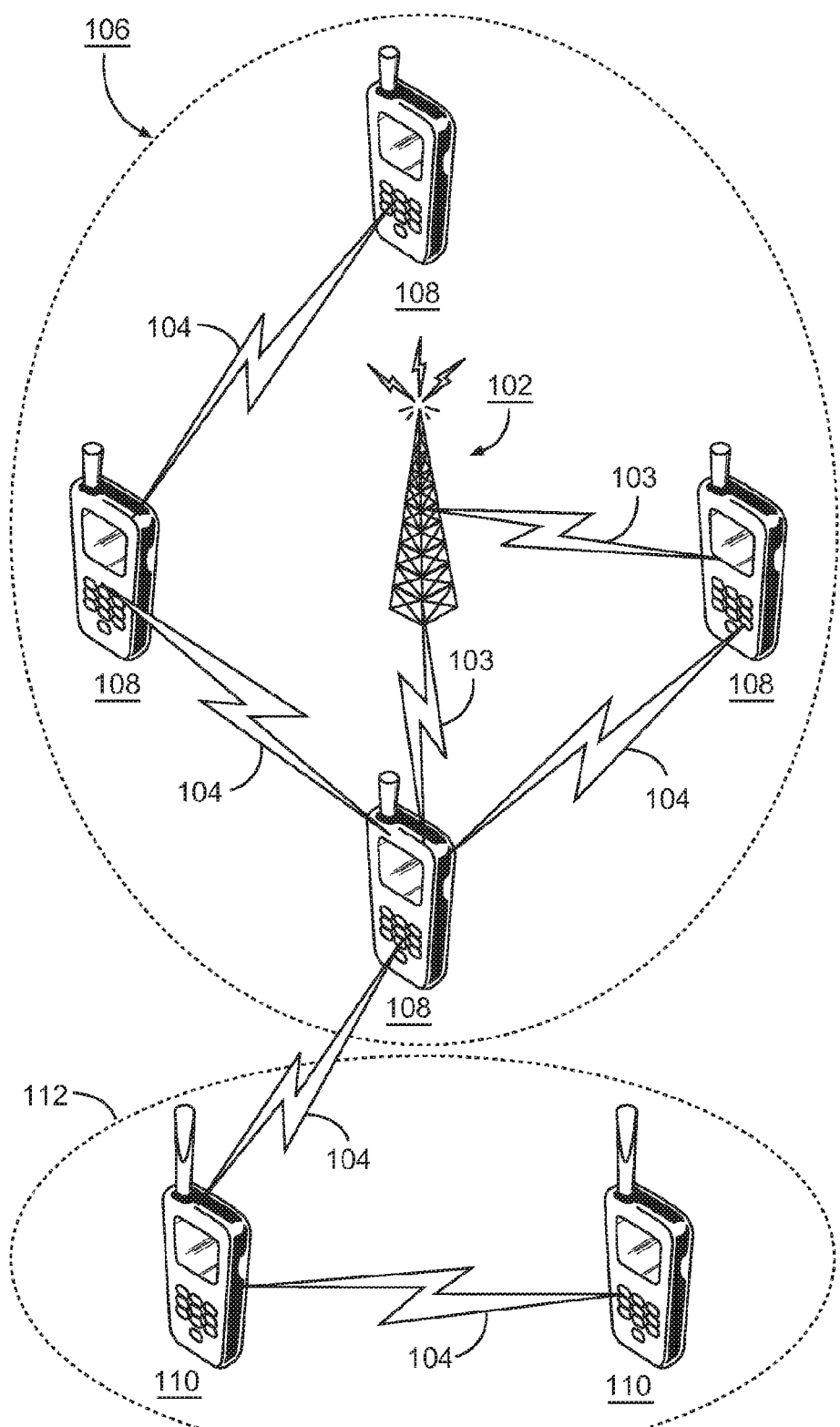
FIG. 1 illustrates an example operating environment in which some embodiments may be implemented.

FIG. 1 illustrates an example operating environment 100 in which some embodiments may be implemented. In operating environment 100, an evolved Node B (eNB) 102 disseminates synchronization signals 103 within a serving cell 106. In some embodiments, a mobile device, such as a UE, that is operating as a synchronization source or peer radio head (PRH) (not shown in FIG. 1) can disseminate these synchronization signals 103. A PRH can also serve as a synchronization reference point. In some embodiments, synchronization signals 103 may comprise information defining a common timing reference.

In various embodiments, one or more UEs 108 located within the serving cell 106 may receive synchronization signals 103 from eNB 102 and use them to enter a synchronous operation mode according to a common timing reference defined by synchronization signals 103. One or more of the UEs 108 may support LTE proximity Services (ProSe). In some embodiments, UEs 110 located outside of serving cell 106 may be unable to receive synchronization signals 103 from eNB 102 and may operate in an asynchronous mode. These UEs 110 can operate within one or more neighboring cells 112, relative to the serving cell 106.

Synchronous-mode UEs 108 can use a synchronous discovery protocol to discover each other using discovery signals 104. According to the synchronous discovery protocol, synchronous-mode UEs 108 may only need to monitor the air interface and/or transmit discovery signals 104 over the air interface during predetermined periodic time intervals. The synchronous discovery protocol may comprise a low duty cycle to allow synchronous-mode UEs 108 to enter a sleep state in between the periodic time intervals, resulting in energy savings on the part of the synchronous-mode UEs 108. However, asynchronous-mode UEs 110 may be unable to use the synchronous discovery protocol, and may instead need to use an asynchronous discovery protocol. The asynchronous discovery protocol may require the asynchronous-mode UEs 110 to continually transmit discovery signals 104 and/or continuously monitor the air interface for discovery signals 104 transmitted by other UEs 108, resulting in significantly increased levels of power consumption. Accordingly, inter-cell device-to-device (D2D) discovery, among other operations, can become difficult or impossible.

Figure 2:
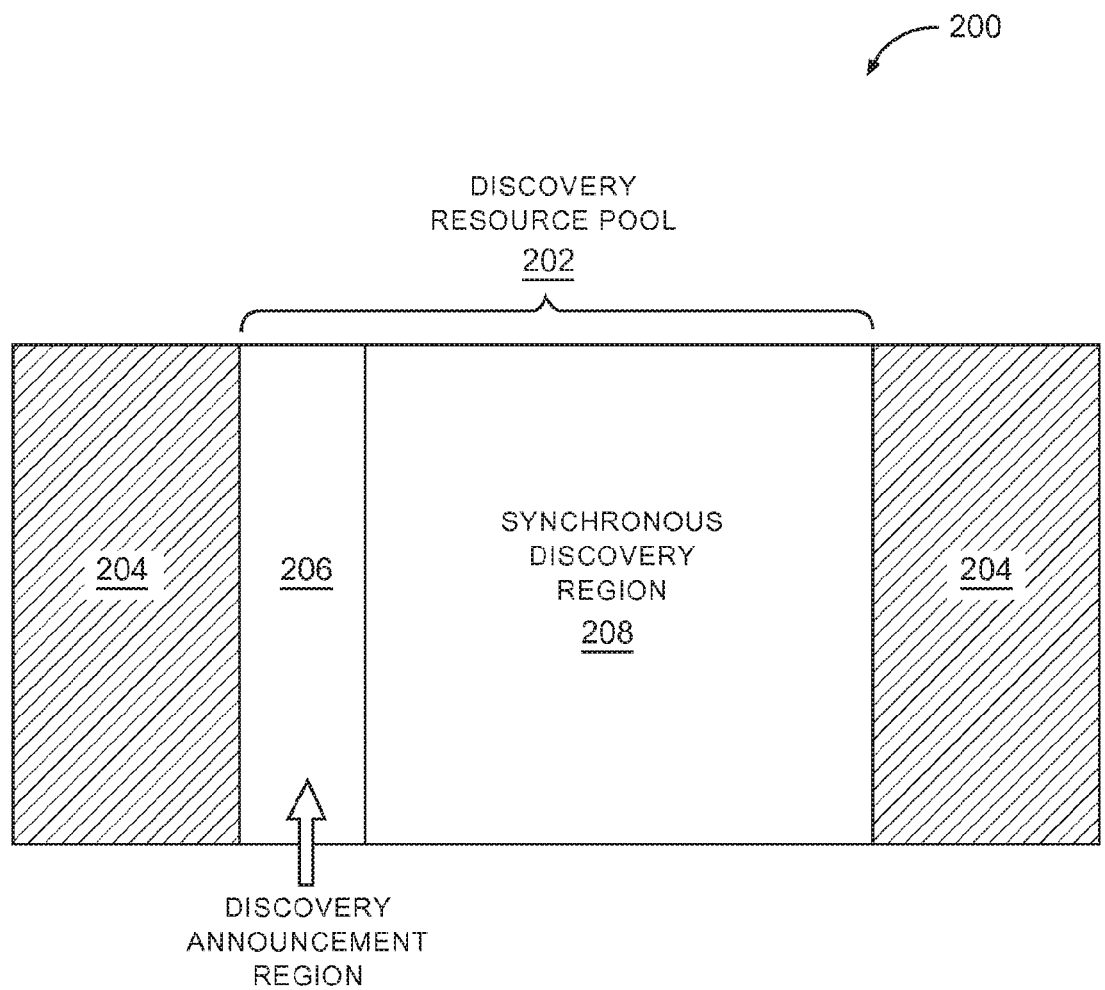
FIG. 2 illustrates a portion of a wireless channel in accordance with some embodiments.

FIG. 2 illustrates a portion of a wireless channel 200 in accordance with some embodiments. As shown in FIG. 2, a portion of the time resources of the wireless channel 200 are allocated to implement the discovery resource pool 202, while other time resources of wireless channel 200 are comprised in non-discovery time intervals 204. The wireless channel 200 also includes a discovery announcement region 206.

To conserve power in conjunction with discovery operations, synchronous-mode UEs, such as UEs 108 (FIG. 1) may only utilize and/or monitor the wireless channel 200 during discovery resource pool 202, and not do so during non-discovery time intervals 204. However, asynchronous-mode UEs such as UEs 110 (FIG. 1) may be unaware of the common timing reference according to which the discovery resource pool 202 is demarcated from non-discovery time intervals 204. As such, in order to ensure that they transmit discovery signals during times at which synchronous-mode UEs 108 are monitoring wireless channel 200, asynchronous-mode UEs 110 in conventional systems may be forced to transmit such discovery signals continually. This may result in interference with non-discovery communications over wireless channel 200 during non-discovery time intervals 204, as well as increased power consumption on the part of the asynchronous-mode UEs 110, thereby further complicating inter-cell D2D discovery operations.

To address these and other concerns, embodiments provide apparatuses and methods to support inter-cell D2D discovery that may be applied to asynchronous network deployments. Inter-cell D2D discovery (with cells belonging to same or different carriers) may be supported in various ways depending on the synchronization properties of the deployment (e.g., synchronous deployment as in time-division duplexing (TDD) systems or asynchronous deployment as in typical frequency-division duplexing (FDD) systems). Inter-cell D2D discovery may also be supported differently based on the level of coordination between neighboring cells, the level of network assistance available at the UE terminals for inter-cell D2D discovery, etc.

For synchronous deployments, a network-common configuration of a D2D discovery resource pool may be realized and thereby simplify the inter-cell D2D discovery procedure considerably. For asynchronous deployments, D2D discovery resource pools may often be configured in a cell-specific manner, and embodiments may provide methods to avoid overlap of the D2D discovery resources of neighboring cells in to avoid asynchronous interference, which is more difficult to control than synchronous interference. At least some inter-eNB coordination may help minimize overlapped D2D discovery resource pools between asynchronous cells. Accordingly, some embodiments provide a coarse inter-eNB time resolution of up to multiple radio frames.

Participating UEs that support inter-cell D2D discovery use a synchronization reference time for the cell and frequency synchronization source information, in addition to configuration information of D2D discovery resource pools of neighboring cells, to discover other UEs. Embodiments provide methods for making configuration information of D2D discovery resource pools of neighboring cells available to UEs desiring to participate in inter-cell D2D discovery.

With regard to reference time and frequency synchronization source information, in some current systems, a UE can obtain this information directly from a neighboring cell based on the primary synchronization signal (PSS), secondary synchronization signal (SSS), or positioning reference signal (PRS) of the neighboring cell. However, not all UEs can acquire the PSS/SSS/CRS of neighboring cells. In accordance with current Long-Term Evolution (LTE) specifications, UEs require a wideband signal to noise ratio (SINR) of at least −6 dB to detect PSS/SSS, but the near-far effect can preclude some UEs from detecting PSS/SSS of the neighboring cell. Accordingly, D2D discovery performance can be degraded for at least those UEs. Embodiments provide methods for UEs to relay D2D discovery resource pool configuration information, reference time information, and frequency synchronization information of serving cells to other UEs that may be served by neighboring cells, as an alternative to obtaining such information using PSS/SSS/CRS.

In some embodiments, an eNB 102 or PRH can select a UE 108 or set of UEs to relay the transmission timing of the corresponding serving cell such that UEs in proximity and belonging to other cells can use this "two-hop" synchronization reference to obtain the time and frequency synchronization of the neighboring cell for inter-cell discovery. Therefore, in accordance with embodiments, the eNB 102 comprises hardware processing circuitry to transmit configuration information for a D2D discovery resource pool that has been configured by a neighboring cell 112, to the selected UE 108 or set of UEs. The configuration information will include a timing offset between the serving cell 106 for the UE 108 and the neighboring cell 112. While only one neighboring cell 112 is described, embodiments are not limited thereto and the configuration information can include configuration information for several D2D discovery resource pools configured by several neighboring cells 112. The selected UE 108 may then relay some or all of this information to other UEs outside the serving cell 106.

In order for the UE 108 to perform this relaying, the eNB 102 will allocate resources to the UE 108, which the UE 108 will use for periodic transmission of synchronization information of the serving cell 106. These resources can also include time resources for a discovery announcement signal containing data of a corresponding discovery announcement region 206 (FIG. 2), at the beginning of each occurrence of the D2D discovery resource pool 202 (FIG. 2).

In some embodiments, the discovery announcement signal can be the same signal as the synchronization signal. However, in some embodiments, a relaying UE 108 may need to transmit the synchronization signals more often than the transmission of discovery announcement signals (i.e., more often than the occurrence of D2D discovery resource pools). While the discovery announcement signals can carry D2D discovery resource pool configuration information, in addition to synchronization information for the serving cell 106, the UE 108 may need to relay synchronization information for a serving cell more frequently than the resource pool configuration information indicated by the discovery announcement signals. This is because, depending on the level of synchronization/asynchronous nature between neighboring cells, UEs receiving synchronization and configuration information may not be able to acquire the time/frequency synchronization for a cell if these relayed synchronization signals are transmitted only as part of the discovery announcement signals right before the D2D discovery resource pool of the corresponding cell. This gives rise to at least two issues. First, the UEs may exhibit increased power consumption because of the additional periodic transmission of synchronization signals, with periodicities that are shorter than typical discovery periods, in addition to discovery announcement signal transmissions at the beginning of each periodic occurrence of discovery resource pool. Second, a resource allocation is necessary for transmission of the "relayed" synchronization signals.

In order to resolve the second issue, the eNB 102 may allocate the resources such that the UE 108 transmits synchronization information to other UEs such as UEs 110 in a neighboring cell 112, more often than the UE 108 transmits the discovery announcement signal (i.e., more frequently than the occurrence of D2D discovery resource pools).

With respect to the first issue, increases in power consumption can be minimized if for instance, information on the coarse timing offset between serving and neighboring cells is signaled to the associated UEs by respective serving cells. If this coarse timing offset information is signaled, the discovery announcement signals themselves may be sufficient for UEs to acquire synchronization for inter-cell discovery operations, thus obviating the need to separately relay synchronization information for a serving cell.

However, in some circumstances, the discovery announcement signals themselves may not be sufficient for providing this synchronization information. In at least these situations, the eNB 102 will assign resources to the select UEs for relaying of this synchronization information. The eNB 102 may assign these resources such that the UE 108 can transmit the synchronization information more frequently than the occurrence of D2D discovery resource pools, The eNB 102 may also allocate resources to avoid overlap of the transmissions of synchronization information relayed from the UEs served by different cells. In one embodiment, the eNB 102 can reserve subframes for relaying synchronization information of the serving cell 106 to reduce or eliminate the overlap of subframes for relaying synchronization information of the serving cell 106 and subframes for relaying synchronization information of one or more of the neighboring cells 112. This may be particularly important in cases in which corresponding D2D discovery resource pools 202 do not overlap. Specifically, in some embodiments, the eNB 102 may reserve time-frequency resources for this purpose on every K-th subframe (e.g., a "synchronization relaying subframe"), where K is greater than 1, within the D2D discovery resource pool 202. In other embodiments, the eNB 102 may reserve time-frequency resources for this purpose on every K-th subframe within a set of available D2D subframes of the serving cell 106.

In embodiments for which the synchronization signals are narrowband, UEs 108 may use the unused physical resource block (PRB)-pairs of these synchronization-relaying subframes for transmission of discovery signals 104. However, UEs 108 should ensure sufficient protection to the synchronization signal transmissions from impact from in-band emissions. For example, a listening UE 110 in cell 112 (FIG. 1) may not be able to receive synchronization signals relayed by UEs 108 in cell 106 due to high interference from in-band emissions generated by other discovery signals 104 being transmitted in cell 106 at maximum transmission power in adjacent PRB-pairs of the synchronization relaying subframe. Accordingly, in embodiments, an eNB 102 may limit transmission power for D2D transmissions on PRBs other than those carrying the relayed synchronization signals on subframes allocated for transmission of discovery announcement signals or relayed synchronization signals so that the transmission power is less than a maximum transmission. The value for the maximum transmission power on synchronization relaying subframes may either be pre-defined or configured by the network 100 via higher layers.

It will be noted that actual, measured impact from in-band emissions can depend on the number of UEs selected for relaying of the serving cell synchronization signals. In general, it may be beneficial to only have some selected UEs relay this information to minimize impact on UE power consumption.

In addition to the synchronization relaying subframes being interspersed within the D2D discovery resource pool, the eNB 102 may configure additional subframes between D2D discovery resource pools as synchronization relaying subframes to increase speed and reliability of acquisition of synchronization information for a neighboring cell 112. For both types of synchronization relaying subframes, the actual synchronization signals transmitted by the UEs may be limited, in the frequency dimension, to central PRB-pairs, such that the set of PRB-pairs are centrally located relative to system uplink (UL) bandwidth. Alternatively, the eNB 102 can allocate the set of PRB-pairs according to a cell-specific offset with respect to the center of the system UL bandwidth. Such cell-specific mapping in the frequency dimension may be more beneficial for synchronization relaying subframes that occur in between two D2D discovery resource pools to avoid overlap of synchronization signals transmitted by UEs belonging to different neighboring cells.

The eNB 102 may also assign resources to meet other additional criteria. For example the UEs selected for relaying synchronization information of a particular cell may transmit their relayed synchronization signals on the same physical resources to realize benefits from single frequency networks (SFN) gains, with the possible tradeoff of an increase in effective delay spread, However, some embodiments may reduce effective delay spread by configuring an extended cyclic prefix (CP) for the D2D discovery resource pool.

Figure 3:
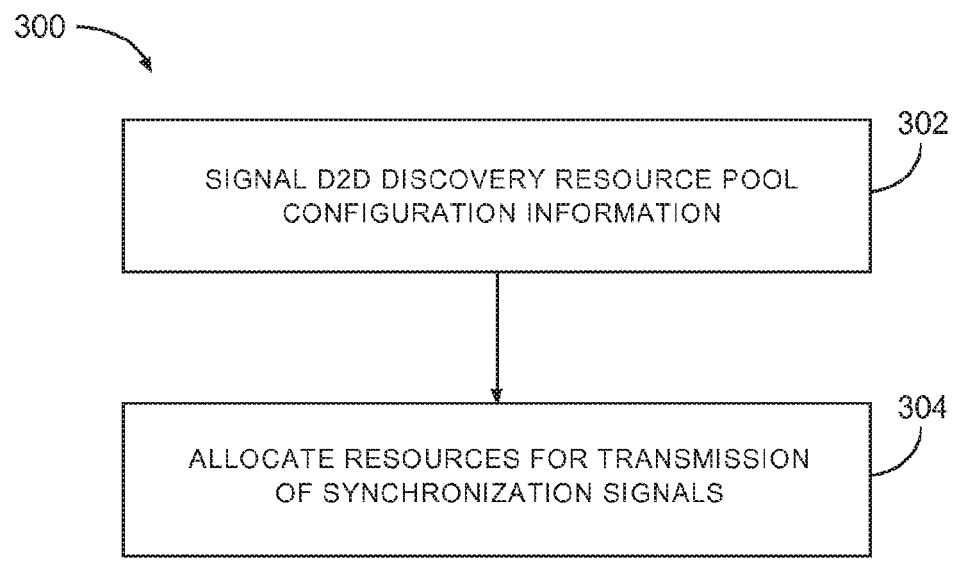
FIG. 3 is a flow chart of a method for supporting inter-cell D2D discovery in accordance with some embodiments.

FIG. 3 is a flow chart of a method 300 for supporting inter-cell D2D discovery in accordance with some embodiments. The example method 300 is described with respect to elements of FIG. 1-2. The eNB 102 (FIG. 1) can perform at least some operations of the method 300 to enable UEs 108 and 110 to obtain information needed for inter-cell D2D discovery. By way of non-limiting example, and as described earlier herein, such information can include reference time and frequency synchronization source information for neighboring cells, and configuration information of D2D discovery resource pools of neighboring cells.

In operation 302, the eNB 102 transmits signaling, to a UE 108, to indicate configuration information for at least device-to-device (D2D) discovery resource pool 202. The configuration information including timing offsets between a serving cell 106 of the UE 108 and the one or more neighboring cells 112. Each D2D discovery resource pool 202 includes D2D resources that have been configured by a corresponding neighboring cell 112. While one neighboring cell 112 has been described regarding various embodiments, it will be understood that information can be provided for inter-cell D2D discovery between several neighboring cells.

In operation 304, the eNB 102 allocates resources to the UE 108 for periodic transmission, by the UE 108, of synchronization information of the serving cell 106. As described earlier herein, the eNB 102 can allocate resources according to various criteria and to achieve various effects. For example, the eNB 102 can allocate resources such that the UE 108 can transmit synchronization information to UEs in neighboring cells more frequently than the UE 108 transmits the discovery announcement signal.

The eNB 102 can perform other operations as part of example method 300 to support inter-cell D2D discovery. For example, the eNB 102 may limit transmission power for D2D transmissions, and the eNB 102 may allocate resources to PRB-pairs to avoid overlap between subframes for relaying synchronization information of the serving cell and subframes for relaying synchronization information of one or more of the neighboring cells.

Figure 4:
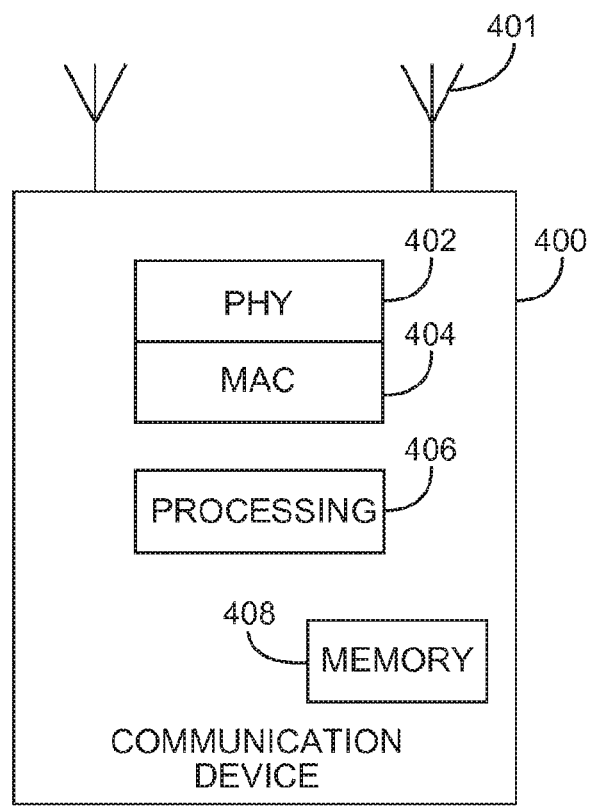
FIG. 4 is a block diagram of the basic components of a communication device in accordance with some embodiments.

FIG. 4 is a block diagram of the basic components of a communication device 400 in accordance with some embodiments. The communication device 400 may be suitable as a UE 108 or 110 (FIG. 1) or as an eNB 102 (FIG. 1). The communication device 400 may support methods for inter-cell D2D discovery, in accordance with embodiments described above with respect to FIG. 1-3. It should be noted that when the communication device 400 acts as an eNB 102, the communication device 400 may be stationary and non-mobile.

In some embodiments, the communication device 400 may include one or more processors and may be configured with instructions stored on a computer-readable storage device. When the communication device 400 serves as a UE 108, the instructions may cause the communication device 400 to receive signaling to indicate configuration information for a D2D discovery resource pool of at least one neighboring cell 112 (FIG. 1). As described earlier herein, the signaling may further include a timing offset between the serving cell 106 (FIG. 1) and the at least one neighboring cell 112 so that the communication device 400 can receive and decipher discovery signals 104 from UEs outside the serving cell 106. The communication device 400 can then transmit a discovery announcement signal that includes the timing offset and synchronization information of the serving cell 106, to a second communication device outside of the serving cell 106.

When the communication device 400 serves as an eNB 102 (FIG. 1), the instructions will cause the communication device 400 to transmit signaling, to a UE 108 (FIG. 1), to indicate configuration information for a D2D discovery resource pool. As described earlier herein, the configuration information will include a timing offset between the serving cell 106 (FIG. 1) for that UE 108 and the neighboring cell 112. While one neighboring cell 112 is described, it will be understood that embodiments are not limited thereto, and timing offsets may be provided for any number of neighboring cells relative to the serving cell.

The communication device 400 may include physical layer circuitry 402 for transmitting and receiving signals to and from other communication devices using one or more antennas 401. The physical layer circuitry 402 may also comprise medium access control (MAC) circuitry 404 for controlling access to the wireless medium. The communication device 400 may also include processing circuitry 406 and memory 408 arranged to perform the operations described herein. In some embodiments, the physical layer circuitry 402 and the processing circuitry 406 may be configured to perform operations detailed in FIGS. 1-3.

In accordance with some embodiments, the MAC circuitry 404 may be arranged to contend for a wireless medium and configure frames or packets for communicating over the wireless medium and the physical layer circuitry 402 may be arranged to transmit and receive signals. The physical layer circuitry 402 may include circuitry for modulation/demodulation, upconversion/downconversion, filtering, amplification, etc.

In some embodiments, the processing circuitry 406 of the communication device 400 may include one or more processors. In some embodiments, two or more antennas 401 may be coupled to the physical layer circuitry 402 arranged for transmitting and receiving signals. The memory 408 may store information for configuring the processing circuitry 406 to perform operations for configuring and transmitting message frames and performing the various operations described herein. The memory 408 may comprise any type of memory, including non-transitory memory, for storing information in a form readable by a machine (e.g., a computer). For example, the memory 408 may comprise a computer-readable storage device, read-only memory (ROM), random-access memory (RAM), magnetic disk storage media, optical storage media, flash-memory devices and other storage devices and media.

The antennas 401 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication device 400 may include one or more of a keyboard, a display, a non-volatile memory port, multiple antennas, a graphics processor, an application processor, speakers, and other mobile device elements. The display may be an LCD screen including a touch screen.

In some embodiments, the communication device 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

Although the communication device 400 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 400 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 5:
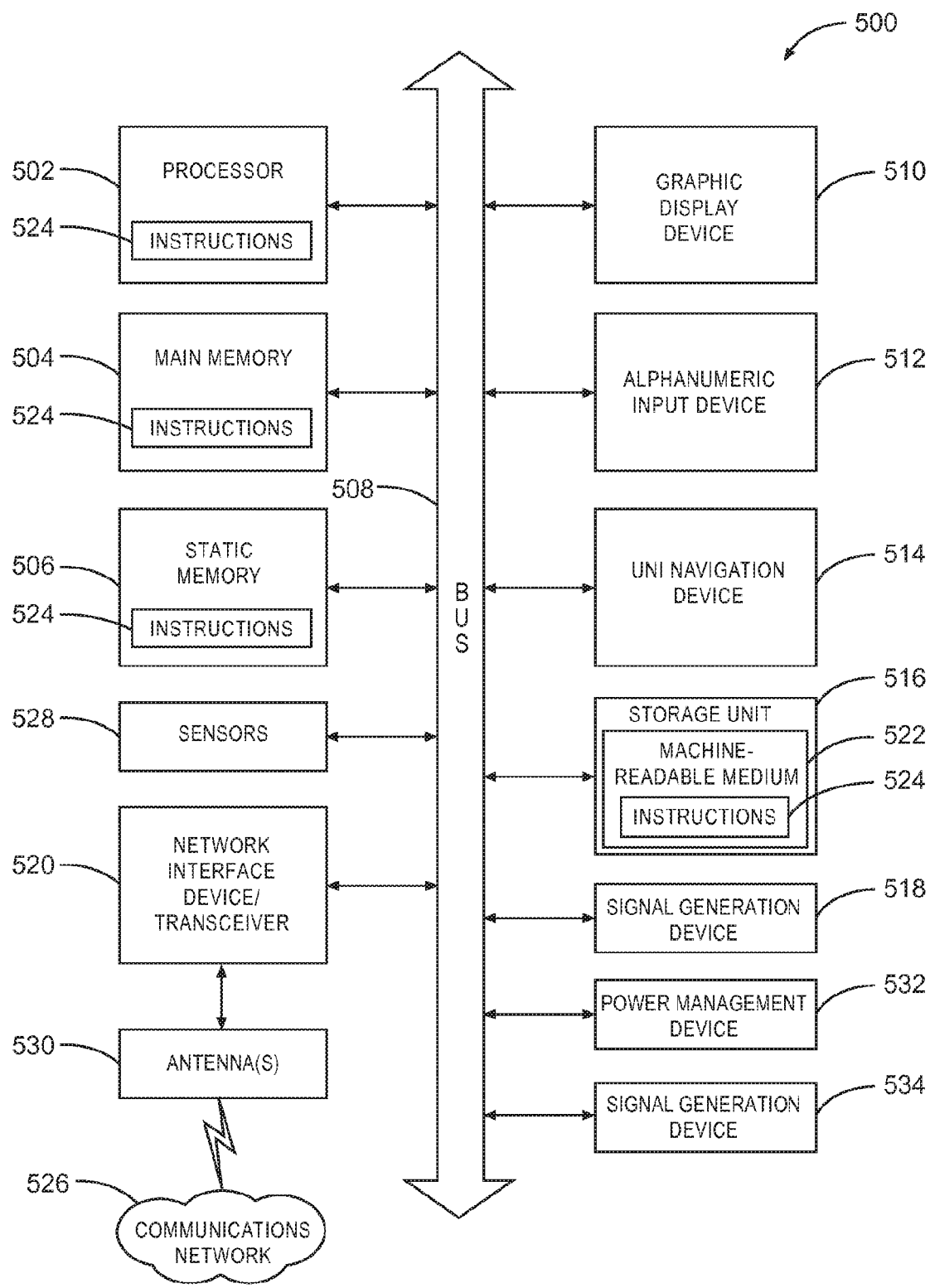
FIG. 5 is a block diagram of a machine for executing various embodiments.

FIG. 5 is a block diagram of a machine 500 for executing various embodiments. In alternative embodiments, the machine 500 may operate as a standalone device or may be connected (e.g., networked) to other machines.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512 and UI navigation device 514 may be a touch screen display. The machine 500 may additionally include a storage device 516 (i.e., drive unit), a signal generation device 518 (e.g., a speaker), a network interface device/transceiver 520 coupled to antenna(s) 530, and one or more sensors 528, such as a global positioning system (GPS) sensor, compass, accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions 524 for execution by the machine 500 and that cause the machine 500 to perform any one or more of the techniques of the present disclosure, or that is capable of storing, encoding or carrying data structures used by or associated with instructions 524. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.

Although the present inventive subject matter has been described in connection with some embodiments, it is not intended to be limited to the specific form set forth herein. One of ordinary skill in the art would recognize that various features of the described embodiments may be combined in accordance with the disclosure. Moreover, it will be appreciated that various modifications and alterations may be made by those of ordinary skill in the art without departing from the scope of the disclosure.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) comprising:
    processing circuitry, the processing circuitry configured to:
        decode signaling with discovery configuration information for sidelink communication, the discovery configuration information indicating a discovery resource pool with a set of subframes and a sidelink synchronization signal of a serving cell;
        decode signaling indicating a synchronization offset between the sidelink synchronization signal and a sidelink synchronization signal associated with a cell of another UE; and
        support inter-cell device-to-device (D2D) discovery by encoding for transmission to the another UE, the discovery configuration information based on the sidelink synchronization signal for the cell of the another UE acquired using the indicated synchronization offset; and
    memory, the memory coupled to the processing circuitry and configured to store the synchronization offset.

2. The apparatus of claim 1, wherein the synchronization offset is indicated by a synchronization window with respect to a synchronization resource of the cell of the another UE indicated by higher layers.

3. The apparatus of claim 1, wherein the processing circuitry is configured to:
    encode for transmission to the cell of the another UE, the discovery configuration information, based on physical sidelink discovery channel (PSDCH) resources indicated by higher layers.

4. The apparatus of claim 1, wherein the signaling indicating the synchronization offset further indicates cell identification of the cell of the another UE.

5. The apparatus of claim 1, wherein the processing circuitry is configured to:
    encode for periodic transmission to the cell of the another UE, a discovery announcement signal at the beginning of the discovery configuration information.

6. The apparatus of claim 5, wherein the processing circuitry is configured to:
    encode for transmission the sidelink synchronization signal and the discovery announcement signal, wherein the transmission of the sidelink synchronization signal is more often than the transmission of the discovery announcement signal.

7. The apparatus of claim 1, further comprising:
    one or more antennas; and
    transceiver circuitry coupled to the processing circuitry and the one or more antennas, and configured to transmit the discovery configuration information.

8. The apparatus of claim 1, wherein the processing circuitry is configured to:
    encode a discovery announcement signal for transmission to the another UE, the discovery announcement signal including the sidelink synchronization signal and the discovery resource pool.

9. The apparatus of claim 8, wherein the processing circuitry is configured to:
    encode the sidelink synchronization signal for transmission to the another UE.

10. The apparatus of claim 9, wherein the processing circuitry is further configured to:
    encode the synchronization signal for periodic transmission to the another UE, wherein the periodic transmission is more frequently than transmission of the discovery announcement signal.

11. The apparatus of claim 10, wherein the sidelink synchronization signal is transmitted periodically according to a periodicity defined by the serving cell.

12. A non-transitory computer readable storage device including instructions stored thereon, which when executed by one or more processors of a User Equipment (UE), cause the UE to perform operations to:

decode signaling with discovery configuration information of a first cell, the discovery configuration information including a sidelink synchronization signal;

decode signaling indicating a synchronization offset between the sidelink synchronization signal of the first cell and a sidelink synchronization signal of a second cell; and support inter-cell device-to-device (D2D) discovery by encoding for transmission to the second cell, the discovery configuration information of the first cell, based on the sidelink synchronization signal of the second cell acquired using the indicated synchronization offset.

13. The non-transitory computer readable storage device of claim 12, wherein the signaling with the D2D discovery configuration information of the first cell is a higher layer signaling.

14. The non-transitory computer readable storage device of claim 12, wherein the synchronization offset is indicated by a synchronization window with respect to a synchronization resource of the second cell.

15. The non-transitory computer readable storage device of claim 12, wherein the instructions further cause the UE to:

encode for transmission to the second cell, the discovery configuration information, based on physical sidelink discovery channel (PSDCH) resources indicated by higher layers.

16. The non-transitory computer readable storage device of claim 12, wherein the signaling indicating the synchronization offset further indicates cell identification of the second cell.

17. The non-transitory computer readable storage device of claim 12, wherein the processing circuitry is configured to:

encode for periodic transmission to the second cell, a discovery announcement signal at the beginning of the discovery configuration information.

18. The non-transitory computer readable storage device of claim 16, wherein the instructions further cause the UE to:

encode for transmission to the second cell, the sidelink synchronization signal and the discovery announcement signal, wherein the transmission of the sidelink synchronization signal is more often than the transmission of the discovery announcement signal.

19. An evolved Node-B (eNB), comprising:
hardware processing circuitry configured to:

support sidelink discovery by encoding signaling for transmission to a first user equipment (UE) within a first cell associated with the eNB, to indicate configuration information for a discovery resource pool that has been configured by a second cell, wherein the configuration information includes a timing offset between the first cell of the first UE and the second cell, the timing offset indicative of a difference in timing synchronization between the first cell and the second cell; and memory coupled to the hardware processing circuitry, the memory configured to store the timing offset.

20. The eNB of claim 19, wherein the hardware processing circuitry is further configured to:

allocate resources to the first UE for periodic transmission based on the timing offset, by the first UE, of synchronization information of the first cell to at least a second UE within the second cell.

21. The eNB of claim 20, wherein the resources include time resources for a discovery announcement signal at the beginning of each occurrence of the D2D discovery resource pool.

22. The eNB of claim 21, wherein the resources are allocated such that the first UE transmits the synchronization information more frequently than the first UE transmits the discovery announcement signal.

23. The eNB of claim 20, wherein the resources are limited, in the frequency dimension, to a set of physical resource block (PRB)-pairs, wherein the set of PRB-pairs are centrally located relative to system uplink bandwidth.

24. The eNB of claim 20, wherein the resources are limited, in the frequency dimension, to a set of physical resource block (PRB) pairs, wherein the set of PRB pairs are allocated according to a cell-specific offset with respect to the center of the system uplink bandwidth.

25. The eNB of claim 20, wherein the hardware processing circuitry is further configured to:

limit transmission power for D2D transmissions on physical resource blocks (PRBs) other than those carrying the synchronization information on subframes allocated for transmission of discovery announcement signals or relayed synchronization signals so that the transmission power is less than a maximum transmission power.

* * * * *